(12) United States Patent
Sun et al.

(10) Patent No.: US 7,039,734 B2
(45) Date of Patent: May 2, 2006

(54) SYSTEM AND METHOD OF MASTERING A SERIAL BUS

(75) Inventors: Weiyun Sun, Vancouver, WA (US); Ricardo Espinoza-Ibarra, Carmichael, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 313 days.

(21) Appl. No.: 10/254,372

(22) Filed: Sep. 24, 2002

(65) Prior Publication Data
US 2004/0059852 A1 Mar. 25, 2004

(51) Int. Cl.
*G06F 13/36* (2006.01)
*G06F 13/368* (2006.01)

(52) U.S. Cl. .................. 710/110; 710/18; 710/119
(58) Field of Classification Search .......... 710/18, 710/36, 110, 113, 107, 17, 306, 244
See application file for complete search history.

(56) References Cited

U.S. PATENT DOCUMENTS

| | | | | |
|---|---|---|---|---|
| 5,506,995 A * | 4/1996 | Yoshimoto et al. | ......... | 710/107 |
| 5,870,573 A * | 2/1999 | Johnson | ......... | 710/316 |
| 5,892,933 A * | 4/1999 | Voltz | ......... | 710/316 |
| 5,983,302 A * | 11/1999 | Christiansen et al. | ......... | 710/113 |
| 6,173,351 B1 * | 1/2001 | Garnett et al. | ......... | 710/309 |
| 6,182,178 B1 * | 1/2001 | Kelley et al. | ......... | 710/314 |
| 6,209,051 B1 * | 3/2001 | Hill et al. | ......... | 710/302 |
| 6,233,635 B1 * | 5/2001 | Son | ......... | 710/315 |
| 6,339,806 B1 * | 1/2002 | Foster et al. | ......... | 710/313 |
| 6,363,452 B1 * | 3/2002 | Lach | ......... | 710/316 |
| 6,591,322 B1 * | 7/2003 | Ervin et al. | ......... | 710/110 |
| 6,658,507 B1 * | 12/2003 | Chan | ......... | 710/100 |
| 6,701,402 B1 * | 3/2004 | Alexander et al. | ......... | 710/305 |
| 6,715,012 B1 * | 3/2004 | Nygren | ......... | 710/100 |
| 6,760,852 B1 * | 7/2004 | Gulick | ......... | 713/324 |
| 2002/0108076 A1 * | 8/2002 | Barenys et al. | ......... | 714/43 |
| 2002/0129186 A1 * | 9/2002 | Emerson et al. | ......... | 710/302 |
| 2003/0212847 A1 * | 11/2003 | Bandholz et al. | ......... | 710/305 |
| 2004/0036808 A1 * | 2/2004 | Lendaro | ......... | 348/725 |

OTHER PUBLICATIONS

Bursky, Dave; "The move to Serial Bus Interfaces Promises Pin-Count Reductions"; Electric Design; Aug. 5, 2002; available online <http://www.elecdesign.com/Articles/Articled/2588/2588.html>.*
Phillips Semiconductors; "The I2C-Bus Specification"; Phillips Semiconductors; Version 2.1; Jan. 2000.*
Tanenbaun, Andrew S.; "Structured Computer Organization"; Third Revision; Prentice-Hall, Inc.; 1990; pp. 11-13.*

* cited by examiner

*Primary Examiner*—Paul R. Myers
*Assistant Examiner*—Ryan Stiglic

(57) ABSTRACT

A method and method of mastering a serial bus. A serial bus is monitored in order to detect a quiescent period on the bus. Responsive to a detection of a quiescent period, bus signals to a first master device of the serial bus are interrupted, isolating the first bus master from the rest of the bus. Once the first bus master is isolated, a second bus master may operate on the bus, free from potential deleterious interference from the first bus master. When the second bus master is finished operating, it may cause the re-coupling of the bus, restoring the capability of the first bus master to operate.

21 Claims, 3 Drawing Sheets

SYSTEM AND METHOD OF MASTERING A SERIAL BUS

TECHNICAL FIELD

Embodiments of the present invention relate to the design of microprocessor-based systems. More particularly, embodiments of the present invention relate to a system and method of mastering a serial bus.

BACKGROUND ART

There are two general classes of communication buses used in microprocessor systems. The first class comprises the "main" system bus, which is usually a parallel arrangement of address and data signals. Such a parallel bus is typically used to communicate with "high speed" peripheral or memory devices. An example of such a set of signals is the Peripheral Component Interconnect (PCI) bus.

A second class of microprocessor communication buses may be called serial buses. Serial buses are frequently employed in many types of computer systems, for example hand held computers. A serial bus may enable, for example, a system processor to communicate with an analog to digital converter which measures battery voltage.

Several standard serial buses have been designed and are widely implemented on both standard and custom integrated circuits. The standardization of a bus design allows products from a wide range of manufacturers to work together, beneficially reducing the workload of product design engineers. One exemplary standard serial bus is known as the Serial Peripheral Interconnect bus, or SPI bus, commercially available on integrated circuit products from Motorola Incorporated, as well as other manufacturers. Another well known standard interconnect bus is known as the Inter-Integrated Circuit bus, commercially available on integrated circuit products from Philips, as well as other manufacturers. The Inter-integrated Circuit bus is more generally known as the $I^2C$ (read "I-squared C") bus, and is frequently printed without the superscript as "I2C."

In general, on a serial bus, e.g., the I2C bus, one device will control a communication at a time. Such a controlling device is known as a master device, and is said to "master" the bus. Other types of devices may be known as slave devices. Slave devices are more passive than master devices. For example, a slave device may only communicate in response to a communication initiated by a master device.

The I2C bus comprises two signal lines, a serial clock line and a serial data line. In order to initiate a communication with a slave device, a master will drive the clock line and synchronously send out a multi-bit address on the data line. Slave devices on the bus respond to specific addresses. When a slave detects its specific address, the slave device initiates its specific function. A slave may be a receive-only device, or it may respond to an inquiry from a master device. In all cases, however, a master device provides and drives the clock signal used to synchronize the data line.

The I2C bus, as well as other serial buses, allows multiple masters to share control or "mastership" of the bus. In general, multiple master devices take turns controlling or "mastering" the bus. In the case of the I2C bus, the I2C standard specifies an arbitration process to determine which master will gain control of the bus. Unfortunately, implementation of the arbitration function and other support for multiple master devices requires additional design effort, additional design duration and additional product cost. As an unfortunate consequence, some otherwise attractive bus master devices have been designed without support for multiple bus masters. Deleteriously, new functional requirements, e.g., product upgrades, that require an additional bus master device, may not be added to a bus comprising a master device that does not support additional bus master devices.

It is expensive in terms of time, personnel resources and monetary outlays to design an integrated circuit. Designs typically require long periods of development, extensive qualification testing and significant non-recurring engineering expenses, e.g., for integrated circuit mask fabrication. A manufacturer may have additional costs associated with managing existing inventory made obsolete or less valuable by a design change to an existing product. Consequently, any addition of function(s) to a serial bus should be compatible with existing bus implementations without the need for revamping well established designs and products.

Thus a need exists for a method and system to add a master controller to a serial bus supporting a single master only. A further need exists to meet the previously identified need that is complimentary and compatible with conventional computer system design techniques. In conjunction with the aforementioned needs, a still further need exists for adding a master to a pre-existing design without revamping established integrated circuit elements.

SUMMARY OF THE INVENTION

A system and method of mastering a serial bus are disclosed. A serial bus is monitored in order to detect a quiescent period on the bus. Responsive to a detection of a quiescent period, bus signals to a first master device of the serial bus are interrupted, isolating the first bus master from the rest of the bus. Once the first bus master is isolated, a second bus master may operate on the bus, free from potential deleterious interference from the first bus master. When the second bus master is finished operating, it may cause the re-coupling of the bus, restoring the capability of the first bus master to operate.

BEST MODES FOR CARRYING OUT THE INVENTION

Figure 1:
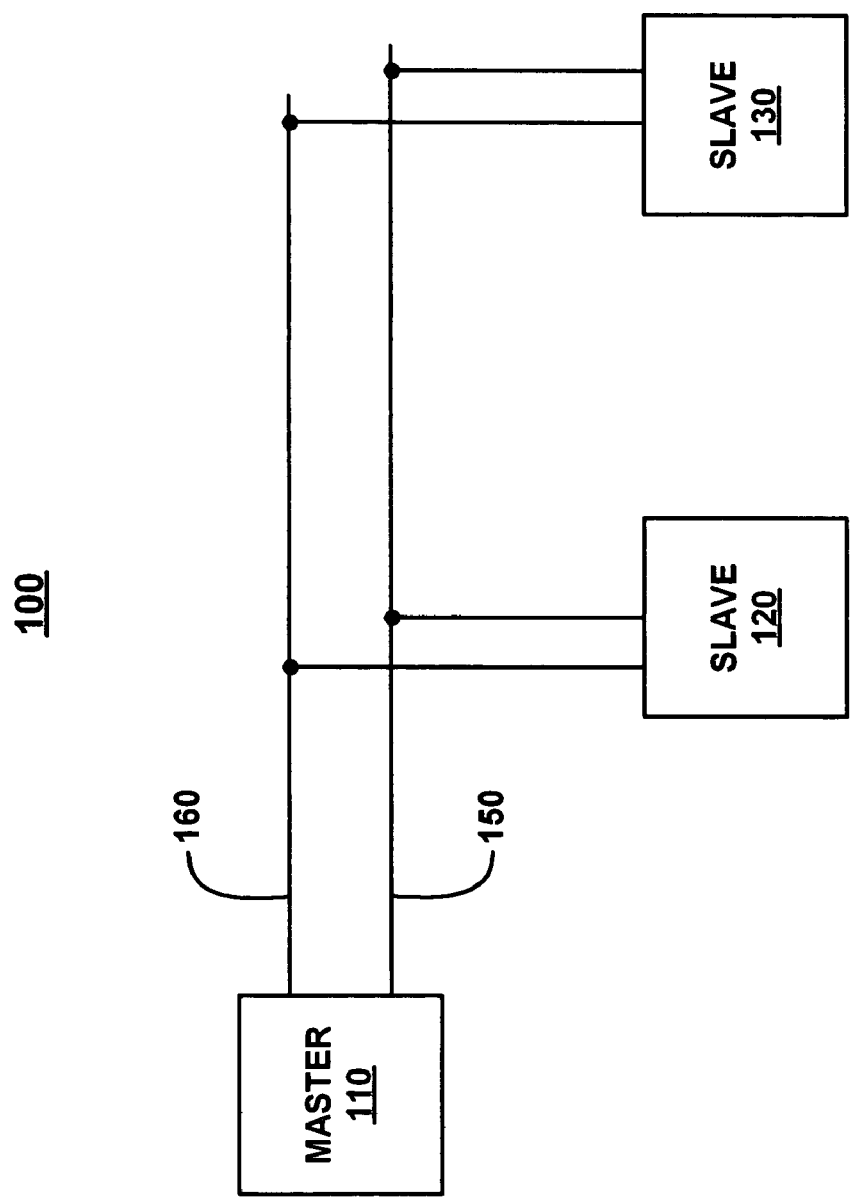
FIG. 1 illustrates a block diagram of an I2C bus system, according to an embodiment of the present invention.

FIG. 1 illustrates a block diagram of an I2C bus system 100, according to an embodiment of the present invention. Master device 110 is coupled to data line 160 and clock line 150. The bus comprising data line 160 and clock line 150 typically comprises traces or wires in a printed circuit board. In general, the wires are in a parallel arrangement, and all pins coupled to a wire are theoretically in the same electrical environment. The bus system 100 may be designed to operate at a variety of bit rates, for example 100 kilo bits per second, or 3.4 Mega bits per second. It is appreciated that minor electrical differences may exist between pins on a wire, for example, due to non ideal characteristics of the printed circuit board traces. It is further appreciated that embodiments of the present invention are well suited to other bit rates.

It is the role of a master device, e.g., master device 110, to control communication on bus system 100. For example, a master device controls the timing of communication by providing a clock signal, and a master device controls the direction of a communication, e.g., from a master device to a slave device, or from a slave device to a master device.

Master device 110 generally drives data line 160 and clock line 150 via "open collector" style drivers. Not shown are typical pull up-resistors coupled to data line 160 and to clock line 150. It is appreciated that other driving arrangements may be made to work in similar bus topologies, according to embodiments of the present invention.

A slave device responds to commands of a master device. For example, a slave device receives a clock signal from a master device. The clock signal controls the rate of bit transmission of data on the bus. The clock signal also identifies a data bit on the data line. Slave devices 120 and 130 are coupled to data line 160 and to clock line 150. Master device 110 does not support additional masters on the same bus. Master device 110 may have been designed without arbitration logic and/or with improper driver circuits. It is to be appreciated that no other master devices are coupled to bus system 100.

An exemplary operation of bus system 100 is initiated by master device 110. Master device 110 drives data line 160 to a "start" condition followed by driving a slave address, of, for example, seven bits, which should be unique to a particular slave device coupled to bus system 100. With each bit driven on to data line 160, master device 110 also drives clock line 150 to synchronously strobe the data. Receiving devices, e.g., slave devices, may typically use the clock strobe to latch the condition of a receiver port. All slave devices monitor a start condition and receive a slave address. In a properly functioning bus system, e.g., bus system 100, only one slave device, e.g., slave device 120, will be addressed by the unique address output by bus master device 110. After the address is completely sent, slave devices not being addressed, e.g., slave device 130, may ignore further communication on the bus until a subsequent "start" condition is initiated by a bus master.

Subsequent to sending a slave address onto the bus, master device 110 will drive a direction bit (in conjunction with a synchronization clock signal) to indicate whether the present operation will be to read (receive) information from the slave device or to write (send) information to the slave device. A series of information packets may then be sent to or received from the particularly addressed slave device. It is appreciated that the command preamble and each data packet are acknowledged from the receiver to the sender.

For example, a slave device will acknowledge that it has been addressed by a master device. If the master command was to read (direction is relative to the master), then a slave device will typically send a predetermined amount of data, for example a byte. The master device provides a clock strobe signal to the slave device to coordinate the transmission. A slave device transmitting data will typically use the clock strobe signal to gate a driver to drive a bit on to the data line. Subsequent to receiving the data, the master device will acknowledge receiving the data. If the command was a write command, then a master device will send a predetermined amount of data to the slave, and the slave device will acknowledge receiving the data.

Unlike many well known networking protocols, e.g., an ethernet bus, an I2C bus is not designed to handle bus contention and/or collisions well. Consequently, there is no back-off interval incorporated into a retry mechanism. If a receiving device fails to acknowledge a transmission, or indicates that the transmission was invalid, the transmission is immediately retried. As a result, a protocol for allowing multiple master devices on such a serial bus typically involves a process for allocating control of the bus which is separate from an actual transmission of information on the bus. With such an allocation mechanism, multiple masters take turns controlling or mastering the bus, and data collisions are avoided.

It may become desirable to add a new function to bus system 100, while maintaining the existing function and design of bus system 100. More particularly, it may be desirable to reuse bus master 110 as a "legacy master" in a new multi-master bus design. A desirable characteristic of a new function device may be to access one or more of slave devices 120 and/or 130. For example, slave device 120 may be a read-only memory device containing product identification information. It may be desirable for legacy master 110 and a new master to both access such information.

Under the conventional art, the addition of a second bus master device to bus system 100 could have multiple deleterious effects. Example scenarios are described below.

Consider a new bus master added to bus system 100. The new bus master communicates with a slave device, for example slave device 130 in a similar manner as described above. More specifically, the new bus master drives clock line 150 and data line 160. While the new bus master is engaged in communication with a slave device, legacy master 110 initiates a communication to a slave device, driving clock line 150 and data line 160.

When the new bus master and legacy bus master 110 both drive lines 150 and/or 160, the results are generally unpredictable. Additionally, clock signals may violate certain timing requirements, for example, a clock pulse may be shorter than an acceptable minimum clock period. Further, data bits generally may not correspond to any recognized synchronizing clock signals. Further, bits on the data line may generally not correspond to acceptable packet frames. As an unfortunate consequence, neither the attempted communication from the new bus master nor from the legacy bus master will be successful.

If the new bus master is compliant with multi-master operations, it may attempt to arbitrate for control of the bus. However, as legacy master 110 is not compliant with multi-master operations, legacy master will not participate in such an arbitration process. Consequently, the new bus master device will never "win" an arbitration process, and will never be "awarded" the bus. As a result, the new bus master may not communicate on the bus, and its desirable function may not occur. In addition, the signaling by the new bus master necessary to arbitrate for the bus may deleteriously interfere with other bus operations, for example a communication initiated by the legacy bus master. It is to be appreciated that the legacy bus master may operate based on an assumption that it is the only master on the bus, and therefore it typically will not monitor the bus prior to utilizing the bus.

In light of such negative consequences, under the prior art a new bus master would typically not be added to an existing bus design comprising a legacy bus master device that was not compatible with multi-master bus protocols. Consequently, the many benefits of reusing design elements in a new design, for example, time to market, allocation of design resources and using a proven design, were not enjoyed.

Figure 2:
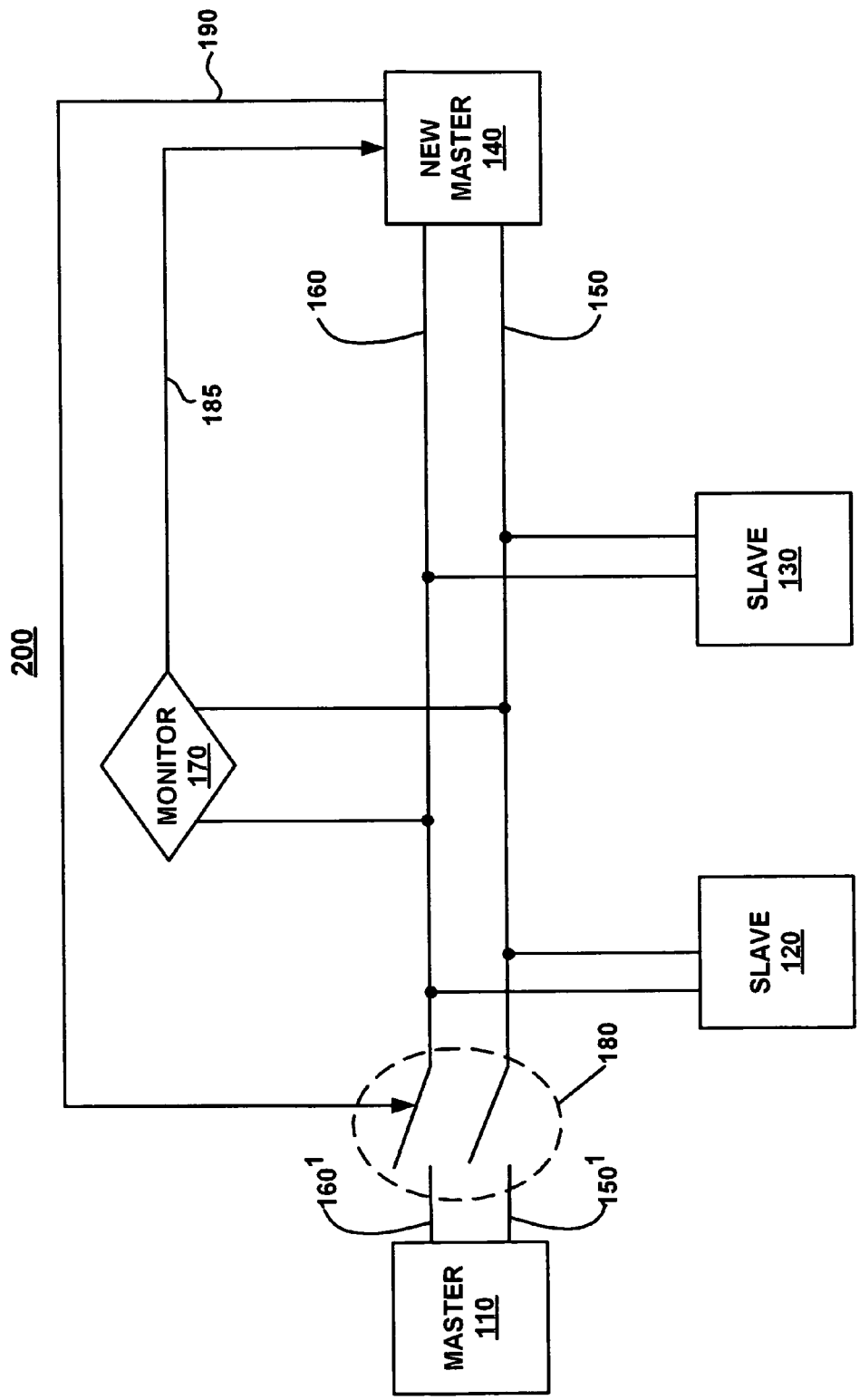
FIG. 2 illustrates a block diagram of an I2C bus system, according to an embodiment of the present invention.

FIG. 2 illustrates a block diagram of an I2C bus system 200, according to an embodiment of the present invention. Bus system 200 comprises switches 180 that selectively interrupt data and clock signals coupled to master device 110. Switches 180 may comprise a wide variety of switching technologies, for example, relays, pass gate devices, analog switches, MOSFET devices, etc. It is desirable, though not required, that switches 180 impose a minimal resistance and/or load on the signal lines, both when open and when closed.

For example, when switches 180 are open, clock line 150 is not coupled to clock line 150', and data line 160 is not coupled to data line 160'. Interrupting the bus lines between master device 110 and other devices of bus system 200 electrically isolates legacy master 110, and forms a new bus, which is a subset of the previous bus configuration, comprising new master 140 and slave devices 120 and 130. It is appreciated that legacy master 110 is not a part of the new bus while switches 180 are open.

Bus master device 140 may be designed to allow legacy bus master 110 to operate on bus system 200 in much the same manner as legacy bus master 110 operated on bus system 100 (FIG. 1). During operation of legacy bus master 110, new bus master 140 does not drive any bus signals. It is appreciated that new bus master 140 need not be designed to be compatible with multi-master bus operation as defined by a bus standard, e.g., the I2C bus standard.

While bus master 110 is operating and controlling bus system 200, bus activity detection logic 170 monitors the bus, e.g., lines 150, 150' and/or 160, 160', to detect bus activity, or the lack thereof. Preferably, bus activity detection logic 170 may implement state machine logic to observe and maintain synchronization with communication from and to bus master 110. For example, bus activity detection logic 170 may count data bits in data packets and detect a stop condition when generated by legacy bus master 110. When such a communication is complete, bus activity detection logic 170 may signal new bus master 140 via signal 185 that the bus is quiescent.

Alternatively, bus activity detection logic 170 may monitor the bus, for example clock line 150, 150'. Responsive to a period of inactivity, for example the lack of a transition on clock line 150 for greater than a maximum bit period, bus activity detection logic 170 may signal new bus master 140 via signal 185 that the bus is quiescent. It is appreciated that embodiments of the present invention are well suited to other methods of determining quiescence of a bus.

Bus activity detection logic 170 may be separate from, or integrated within new bus master 140. The I2C bus specification requires that "a (compliant) master may start a transfer only if the bus is free." As a consequence, some bus master device designs may comprise logic to determine if a bus is free. Bus activity detection logic 170 may comprise such logic, according to an embodiment of the present invention.

According to an alternative embodiment of the present invention, bus activity detection logic 170 may comprise software. For example, software of a microcontroller within an I2C device or of a microprocessor hosting an I2C device may monitor register bits corresponding to bus signal lines to determine activity or lack of activity on a bus. Responsive to bus quiescence, for example, a lack of activity for greater than a maximum bit period, such software may generate a signal that the bus is quiescent.

Responsive to an indication that the bus is free of activity, or quiescent, new bus master 140 may signal switches 180, via signal line 190, to open, interrupting bus signals and isolating bus master device 110. For example, when switches 180 are open, line 150 is not coupled to line 150', and line 160 is not coupled to 160'. According to an alternative embodiment of the present invention, switch 180 may be a network device, compliant with network protocols, and may receive commands to open and/or close via network communication, for example via bus signals 150 and 160. Preferably, both clock signal 150 and data signal 160 are interrupted so that master device 110 is completely isolated.

According to an alternative embodiment of the present invention, new bus master 140 does not have to cause the interruption of bus signals solely in response to an indication of a bus free condition. New bus master 140 may combine an indication of bus quiescence, e.g., indicated by bus activity detection logic 170 via signal 185, with an indication of new bus master 140's need to access the bus, in order to determine if it is necessary to signal switch 180 to interrupt bus signals. For example, switches 180 may be caused to open if the bus is quiescent AND new bus master 140 desires to access the bus. It is appreciated that interrupting bus signals, and hence preventing bus master 110 from operating on the network, may unnecessarily limit the functionality of bus master 110 if bus master 140 does not need to operate on the bus.

Subsequent to opening switch 180, new bus master device 140 is able to control the new, segmented bus in order to successfully communicate with slave devices, e.g., slave devices 120 and 130. Due to the open switches, bus master 110 is electrically isolated from the new bus segment. As a beneficial result, bus master 110 is unable to deleteriously interfere with the operation of bus master 140 on the new bus segment.

For example, if legacy master 110 attempts to communicate with slave 120 during a bus mastering operation of new bus master 140, the bus mastering operation of new bus master 140 will complete without interruption. Legacy bus master 110 may continue to drive segments 150' and 160' without ill effect. In a typical case, legacy bus master 110 will continue to attempt its operation until switches 180 close (e.g., under command from bus master 140 after bus master 140 has completed its operation on the bus) and segments 150' and 160' are re-coupled to lines 150 and 160 respectively. At this point, legacy bus master 110 may complete its operation.

It is to be appreciated that numerous deleterious effects present in the prior art are consequently avoided. Because legacy bus master 110 is electrically isolated, its attempted operation can not interfere with the signals, e.g., clock signals on clock line 150, generated by bus master 140. Because legacy bus master 110 is electrically isolated, its attempted operation can not hold off bus master 140 if, for example, bus master 140 is arbitrating for the bus in compliance with specified multi-master bus protocols.

It is to be appreciated that new bus master device 140 may communicate with other slave or master devices as well. It is to be further appreciated that additional new bus masters (not shown) may be coupled to switch 180, for example, via open collector signals, and optionally coupled to bus activity detection logic 170, in order to isolate legacy bus master 110 in a similar fashion. In this manner, multiple new bus masters that are compatible with a multi-master bus arrangement may cooperatively use the bus while avoiding deleterious interference from legacy bus master 110, according to an embodiment of the present invention.

When new bus master device 140 has completed its communication, for example, finished reading information from slave device 120, new bus master device 140 may signal switch 180 to close via signal 190, re-coupling lines 150 and 150', and 160 and 160'. Closing switch 180 restores bus system 200 to an original configuration, allowing legacy bus master device 110 to control the bus once again.

Figure 3:
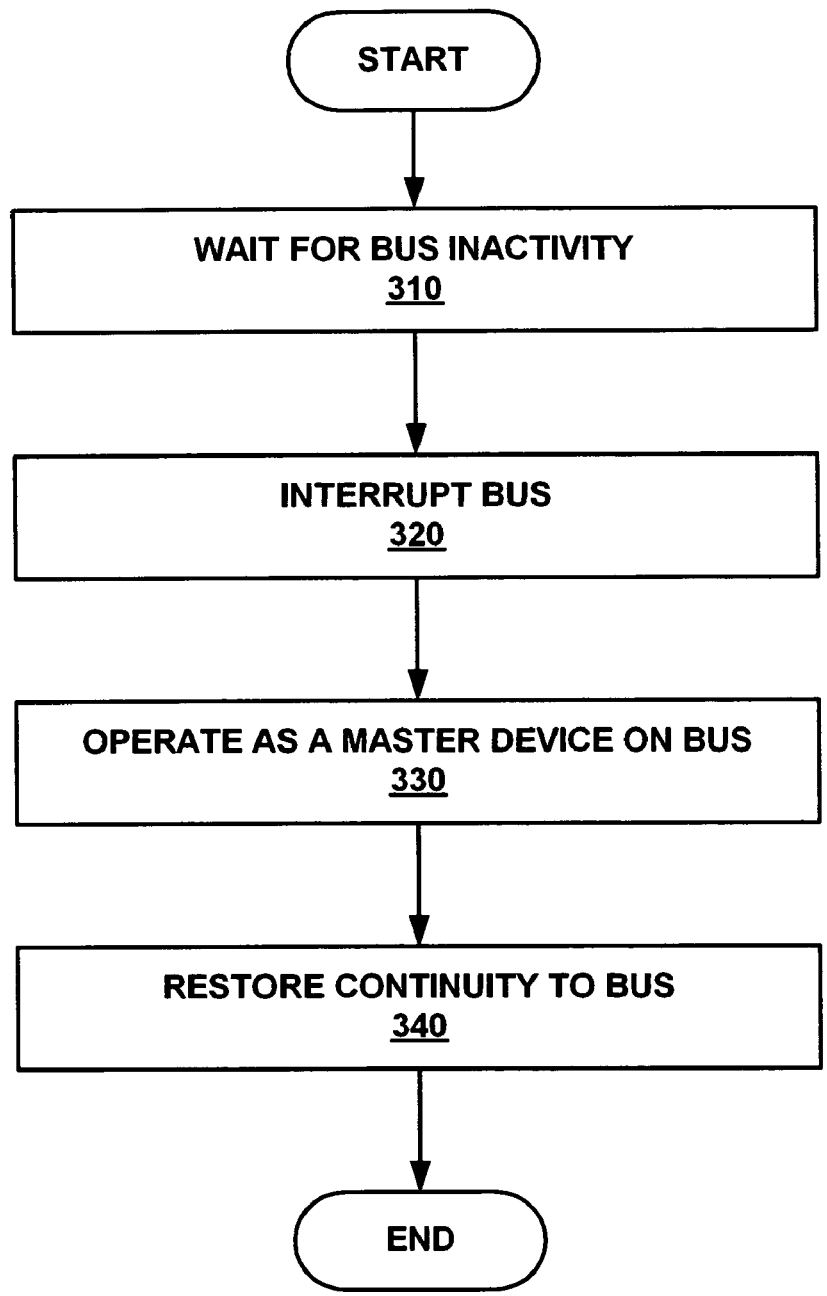
FIG. 3 illustrates a flow chart for a method of mastering a serial bus, according to an embodiment of the present invention.

Many bus master devices, e.g., bus master device 140 of FIG. 2, comprise peripheral circuitry of a microprocessor or other form of stored program computer. Bus slave devices may also be controlled by a microprocessor or microcontroller. Alternatively, state machine logic may control bus interactions for slave and/or master devices. FIG. 3 illustrates a flow chart for a method 300 of mastering a serial bus, according to an embodiment of the present invention. Method 300 may be implemented by a variety of well known by methods, for example a stored program computer or by state machine logic, in accordance with embodiments of the present invention.

In step 310, a new bus master, for example new bus master 140 (FIG. 2), waits for an indication that a bus is inactive. An indication of bus inactivity may be generated, for example, by bus activity detection logic 170. Bus activity detection logic 170 may implement state machine logic to observe and maintain synchronization with communication from and to another bus master device, e.g., bus master 110. When such a communication is complete, bus activity detection logic 170 may signal new bus master 140 via signal 185 that the bus is quiescent.

Alternatively, bus activity detection logic 170 may monitor the bus, for example clock line 150, 150'. Responsive to a period of inactivity, for example the lack of a transition on clock line 150 for greater than a maximum bit period, bus activity detection logic 170 may signal new bus master 140 via signal 185 that the bus is quiescent.

Further, a new bus master, e.g., bus master 140, may comprise logic to determine if the bus is in a free state as a part of its multi-master capabilities. Such logic may be used to generate an indication that a bus is inactive. It is appreciated that embodiments of the present invention are well suited to other methods of determining quiescence of a bus.

According to an alternative embodiment of the present invention, bus inactivity, or quiescence, may be detected by software. For example, software of a microcontroller within an I2C device or of a microprocessor hosting an I2C device may monitor register bits corresponding to bus signal lines to determine activity or lack of activity on a bus. Bus quiescence may be detected, for example, by observing a lack of activity for greater than a maximum bit period. Such software may generate a signal that the bus is quiescent.

In step 320, the bus is interrupted so as to isolate a bus master device, e.g., bus master 100, that is not compatible with multi-master operation. For example, switches 180 (FIG. 2) may be commanded to open, electrically isolating bus master device 100. Preferably, an interrupting device, e.g., switches 180, is placed between the bus master device to be isolated and all remaining bus devices. It is to be appreciated that embodiments of the present invention are well suited to other placements of interrupting devices. A command to interrupt a bus may typically derive from a new bus master device.

In step 330, a new bus master device, e.g., new bus master 140 of FIG. 2, operates as a master device on a bus, for example, communicating to a slave device, e.g., slave device 120 of FIG. 2. Advantageously, the new bus master device may operate on the bus free of deleterious interference from a legacy bus master device.

In optional step 340, a new bus master device may re-establish full bus coupling so as to restore the capability of another bus master device, e.g., bus master 110, to operate on a bus. Such restoration may be accomplished, for example, by commanding switches 180 (FIG. 2) to close, re-coupling lines 150 and 160 with 150' and 160'. Such a command would typically be issued after the new bus master completed its operation on the bus.

Embodiments of the present invention provide for a method and system to add a master controller to a serial bus supporting a single master only. Further embodiments of the present invention are complimentary and compatible with conventional computer system design techniques. Still further embodiments of the present invention add a bus master to a preexisting design without revamping established integrated circuit elements.

The preferred embodiment of the present invention, system and method of mastering a serial bus, is thus described. While the present invention has been described in particular embodiments, it should be appreciated that the present invention should not be construed as limited by such embodiments, but rather construed according to the below claims.

What is claimed is:

1. A method of mastering a serial bus comprising:
monitoring said bus to detect a quiescent period;
responsive to detection of said quiescent period, interrupting bus signal lines to a first master device of said serial bus; and
operating a second master device on said serial bus, wherein said second master device comprises circuitry to monitor said bus to detect a quiescent period.

2. The method as described in claim 1 wherein said serial bus is substantially compliant with the Inter-Integrated Circuit bus.

3. The method as described in claim 2 wherein said first master device does not support the operation of another master device on said serial bus.

4. The method as described in claim 1 wherein said interrupting comprises interrupting a clock signal line and a data line of said serial bus.

5. The method as described in claim 1 wherein said monitoring comprises execution of software.

6. The method as described in claim 1 wherein said monitoring does not comprise execution of software.

7. The method as described in claim 1 further comprising restoring continuity of said bus signal lines to said first master device subsequent to completion of an operation of said second master device.

8. A serial bus network comprising:
bus signals;
a first bus master device that is not compatible with multi-master operation coupled to said bus signals;
a plurality of network slave devices coupled to said bus signals;
bus activity detection logic coupled to said bus signals for detecting bus quiescence;
a switching device coupled to and in line with said bus signals for selectively interrupting one or more of said bus signals;
a second bus master device coupled to said bus signals;
said second bus master device further coupled to said bus activity detection logic for receiving a signal of bus quiescence; and
said second bus master device further coupled to said switching device for controlling the interruption of said one or more of said bus signals.

9. The serial bus network as described in claim 8 wherein said switching device is located on said bus between said first master device and all other network devices.

10. The serial bus network as described in claim 8 wherein said second bus master device comprises said bus activity detection logic.

11. The serial bus network as described in claim 8 wherein said switching device interrupts all said bus signals.

12. The serial bus network as described in claim 8 wherein said bus signals are substantially compliant with the Inter-Integrated Circuit bus.

13. The serial bus network as described in claim 8 wherein said switching device communicates with said second bus master via said bus signals.

14. The serial bus network as described in claim 8 wherein said second bus master device comprises said switching device.

15. The serial bus network as described in claim 8 wherein said bus activity detection logic comprises software.

16. A networking device comprising means for controlling an interruption of a serial bus network comprising:
   means for monitoring said serial bus to detect a quiescent period;
   means for interrupting bus signal lines to a first master device of said serial bus responsive to detection of said quiescent period; and
   means for operating a second master device on said serial bus, wherein said second master device comprises means to monitor said bus to detect a quiescent period.

17. The networking device as described in claim 16 wherein said means for controlling an interruption of a serial bus network comprises means for receiving an indication that said serial bus is quiescent.

18. The networking device as described in claim 16 wherein said means for controlling an interruption of a serial bus network comprises means for signaling a switching device to interrupt one or more signals of said serial bus network.

19. The networking device as described in claim 18 wherein said means for signaling a switching device to interrupt one or more signals of said serial bus network comprises means for communicating with said switching device via said signals of said serial bus.

20. The networking device as described in claim 17 wherein said means for receiving an indication that said serial bus is quiescent comprises means for communicating with bus activity detection logic via said signals of said serial bus.

21. The networking device as described in claim 17 wherein said means for receiving an indication that said serial bus is quiescent comprises means for detecting an absence of a transition on a clock signal line of said serial bus.

* * * * *